US008938625B2

(12) United States Patent
Grab et al.

(10) Patent No.: US 8,938,625 B2
(45) Date of Patent: Jan. 20, 2015

(54) SYSTEMS AND METHODS FOR SECURING CRYPTOGRAPHIC DATA USING TIMESTAMPS

(75) Inventors: Eric William Grab, San Diego, CA (US); Francis Yee-Dug Chan, San Diego, CA (US); Michael George Kiefer, Scottsdale, AZ (US)

(73) Assignee: Sonic IP, Inc., San Diego, CA (US)

( * ) Notice: Subject to any disclaimer, the term of this patent is extended or adjusted under 35 U.S.C. 154(b) by 0 days.

(21) Appl. No.: 13/436,930

(22) Filed: Mar. 31, 2012

(65) Prior Publication Data
US 2013/0007471 A1 Jan. 3, 2013

Related U.S. Application Data

(63) Continuation-in-part of application No. 13/339,315, filed on Dec. 28, 2011.

(60) Provisional application No. 61/502,711, filed on Jun. 29, 2011, provisional application No. 61/502,705, filed on Jun. 29, 2011.

(51) Int. Cl.
H04L 29/06 (2006.01)
G06F 21/10 (2013.01)

(52) U.S. Cl.
CPC ............ *G06F 21/10* (2013.01); *H04L 2463/121* (2013.01)
USPC ............. 713/193; 713/161; 713/170; 380/37; 380/44; 380/241; 380/242; 380/202; 726/21; 726/32; 726/33

(58) Field of Classification Search
CPC .................... G06F 21/10; H04L 2463/121
USPC .......... 713/193, 170, 161, 168; 380/201–203, 380/239–242, 210–211, 37, 44; 726/32–33, 726/21
See application file for complete search history.

(56) References Cited

U.S. PATENT DOCUMENTS 5,717,756 A * 2/1998 Coleman ....................... 713/155
7,162,037 B1 * 1/2007 Schwenk ....................... 380/286
(Continued)

OTHER PUBLICATIONS

Abouaissa, A; et al; "A multicast synchronization protocol for real time distributed systems"; Networks, 1999. (ICON '99) Proceedings. IEEE International Conference on ;DOI: 10.1109/ICON.1999. 796155; Publication Year: 1999 , pp. 21-28.*
(Continued)

*Primary Examiner* — Harunur Rashid
*Assistant Examiner* — Angela Holmes
(74) *Attorney, Agent, or Firm* — KPPB LLP

(57) ABSTRACT

Systems and methods for authenticating playback devices using timestamp validation in accordance with embodiments of the invention are disclosed. One embodiment includes securely storing at least one timestamp in memory within a playback device in response to the occurrence of at least one predetermined event, where a stored timestamp is based on the current time of a system clock when an event occurs, generating a cryptographic key using the at least one timestamp, securing cryptographic data using the cryptographic key, receiving a request to playback encrypted content, where the encrypted content is accessible using the cryptographic data, accessing the at least one timestamp, generating the cryptographic key, accessing the cryptographic data using at least the cryptographic key, and playing back the content using the playback device.

13 Claims, 13 Drawing Sheets

(56) References Cited

U.S. PATENT DOCUMENTS

| | | |
|---|---|---|
| 2002/0044657 A1 | 4/2002 | Asano et al. |
| 2002/0114453 A1* | 8/2002 | Bartholet et al. ............... 380/44 |
| 2005/0022019 A1 | 1/2005 | Medvinsky et al. |
| 2005/0063669 A1 | 3/2005 | Kato et al. |
| 2008/0201580 A1* | 8/2008 | Savitzky et al. .............. 713/189 |
| 2008/0294926 A1 | 11/2008 | Eshraghian et al. |
| 2009/0119217 A1 | 5/2009 | Ham |
| 2009/0287942 A1 | 11/2009 | Betouin et al. |
| 2010/0189256 A1 | 7/2010 | Doehla et al. |
| 2010/0189424 A1 | 7/2010 | Doehla et al. |
| 2011/0041186 A1 | 2/2011 | Strohwig et al. |
| 2012/0060228 A1* | 3/2012 | Katkar ........................... 726/33 |
| 2013/0004142 A1 | 1/2013 | Grab et al. |

OTHER PUBLICATIONS

Ingram, D.M.E.; et al., "Test and evaluation system for multi-protocol sampled value protection schemes";PowerTech, 2011 IEEE Trondheim; DOI: 10.1109/PTC.2011.6019243; Publication Year: 2011 , pp. 1-7.*

* cited by examiner

SYSTEMS AND METHODS FOR SECURING CRYPTOGRAPHIC DATA USING TIMESTAMPS

CROSS-REFERENCE TO RELATED APPLICATIONS

The current application claims priority to U.S. Provisional Patent Application Ser. No. 61/502,711, filed Jun. 29, 2011, and as Continuation-In-Part to U.S. patent application Ser. No. 13/339,315 filed Dec. 28, 2011, which claims priority to U.S. Provisional Patent Application Ser. No. 61/602,705, filed Jun. 29, 2011, The disclosure of U.S. Provisional Patent Application Ser. Nos. 61/502,711 and 61/602,705 and U.S. patent application Ser. No. 13/339,315 is incorporated herein by reference in its entirety.

FIELD OF THE INVENTION

The present invention relates generally to managing rights to playback of media content by a player, and more specifically to systems and methods for reliably identifying a playback device and protecting digital rights management (DRM) information stored on a playback device from tampering.

BACKGROUND OF THE INVENTION

Many consumer electronics devices are equipped to play digital video and audio content from various sources and include a range of computing power. A variety of digital rights management (DRM) systems exist to prevent copying of protected content and facilitate authorized use by consumers on their devices. DRM systems typically restrict content to certain devices and/or certain users using different authentication methods or encryption of content. Many DRM systems rely on the encryption of part or the whole of content files. The encryption keys necessary to encrypt and/or decrypt content can be considered "shared secrets" known to the content provider (such as a digital video content server) or a system performing encryption for the content provider (such as a third-party trusted system) and to the content receiver (such as a playback device). Often combinations of keys are used together to protect content to facilitate encryption of content and issuance of content to a specific user and/or user device.

SUMMARY OF THE INVENTION

Systems and methods for authenticating playback devices using timestamp validation in accordance with embodiments of the invention are disclosed. One embodiment of the method of the invention includes securely storing at least one timestamp in memory within a playback device in response to the occurrence of at least one predetermined event, where a stored timestamp is based on the current time of a system clock within the playback device when a predetermined event occurs, generating a cryptographic key using information including the at least one timestamp, securing cryptographic data used to playback encrypted content on the playback device using the cryptographic key, receiving a request to playback encrypted content via a user interface on the playback device, where the encrypted content is accessible using the cryptographic data securely stored in the memory of the playback device, accessing the at least one timestamp securely stored in memory using the playback device, generating the cryptographic key using information including the at least one retrieved timestamp, accessing the cryptographic data using at least the cryptographic key generated using information including the at least one retrieved timestamp, and playing back the content using the playback device.

A further embodiment of the invention also includes deleting the cryptographic data from memory, when the system clock is invalid.

In another embodiment of the invention, the cryptographic data is further secured using device match data.

A still further embodiment of the invention also includes validating the system clock of the playback device using the at least one timestamp.

In still another embodiment of the invention, the at least one timestamp is further secured using a product key derived from product provisioning characteristics.

A yet further embodiment of the invention includes a processor, memory containing a client application, and a system clock. In addition, the processor is configured by the client application to securely store at least one timestamp in memory in response to the occurrence of a predetermined event, where a stored timestamp is based on the current time of a system clock when the predetermined event occurred, generate a cryptographic key using information including the at least one timestamp, secure cryptographic data used to playback encrypted content on the playback device using the cryptographic key, receive a request to playback encrypted content via a user interface, where the encrypted content is accessible using the cryptographic data securely stored in the memory of the playback device, regenerate the cryptographic key, access the cryptographic data using at least the cryptographic key, and play back the content.

In yet another embodiment, the client application configures the processor to regenerate the cryptographic key by configuring the processor to access the at least one timestamp securely stored in memory, and generate the cryptographic key using information including the at least one retrieved timestamp.

In a further embodiment again, the at least one timestamp is further secured using a product key derived from product provisioning characteristics.

In another embodiment again, the cryptographic data is further secured using device match data.

In a further additional embodiment, the client application further configures the processor to retrieve device match data and generate a device protection key that can be used in the generation and regeneration of the cryptographic key.

In another additional embodiment, the requested to playback encrypted content refers to a piece of content that is subject to a time-limiting rule, and the client application further configures the processor to determine whether the current time of the system clock of the playback device is consistent with the time-limiting rule associated with the piece of content.

In a still yet further embodiment, the client application further configures the processor to validate the system clock of the playback device using the at least one timestamp stored in the memory of the playback device.

In still yet another embodiment, the at least one timestamp includes a last program run timestamp indicating the last time the client application was run and the client application configures the processor to validate the system clock based upon the last program run timestamp.

In a still further embodiment again, the at least one timestamp includes a last file played timestamp indicating the last time the client application played a file on the device and the client application configures the processor to validate the system clock based upon the last file played timestamp.

In still another embodiment again, the at least one timestamp includes a last server connection timestamp indicating the last time the device connected to a server and the client application configures the processor to validate the system clock based upon the last server connection timestamp.

DETAILED DISCLOSURE OF THE INVENTION

Figure 1:
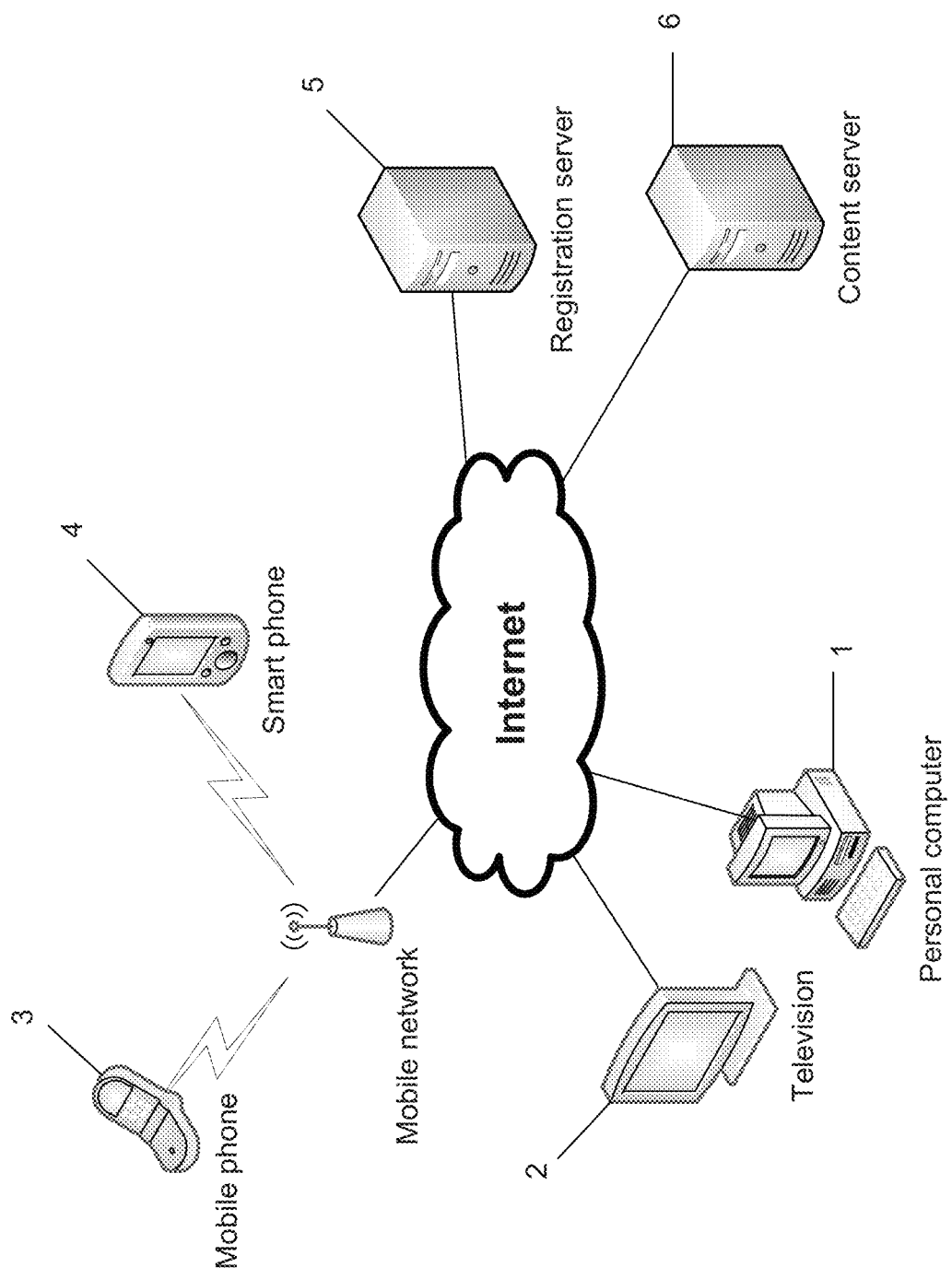
FIG. 1 is a system diagram illustrating a DRM and content distribution system in accordance with an embodiment of the invention.

Turning now to the drawings, systems and methods for authenticating playback devices using timestamp validation are illustrated. The system clock on a playback device provides a device time that may be used to regulate playback of time-limited content such as rentals. A method to circumvent time-limiting rules can involve altering the system clock to change the device time such that the effective device time falls within the time-limiting rule, even after the rental has expired (i.e., the actual current time is after the time specified in the rule governing the rental). Thus, detection of "rollback," or alteration of the system clock, is desirable in order to properly regulate the playback of rental or other time-limited content. In many embodiments of the invention, timestamps are captured for various events performed by playback devices and used to validate the system clock on the playback device. As will be discussed further below, processes can be performed to check timestamps and verify that the system clock has not been rolled back. In addition, timestamps may be used to generate a cryptographic key to secure cryptographic data used to playback encrypted content. The cryptographic key can be used to encrypt the cryptographic data and/or other data on a user device. In several embodiments of the invention, the cryptographic key can be used in combination or in sequence with a product key, a device protection key, and/or other keys to encrypt data.

Playback devices that include system clocks can include personal computers, digital disk players, and cellular phones. Ideally, all devices participating in a digital rights management (DRM) system are uniquely identifiable to the DRM system and include a tamper-resistant anti-rollback clock. Manufacturing a consumer electronics device so that it includes a unique piece of data stored in its non-volatile memory can be expensive and complex. Therefore, many DRM systems load a shared secret onto a device at the time the device is registered with the DRM system. The shared secret typically takes the form of cryptographic data that can be utilized to decrypt content, which has been specifically encrypted for decryption using the cryptographic data. In many DRM systems, the cryptographic data issued by the DRM system is unique to the device. In several DRM systems, the cryptographic data issued by the DRM system is unique to a specific user account and is shared by a number of devices that are registered to the user account.

The shared secret used during registration of a playback device may be restricted to be known only to the content provider (such as a digital video content server) or a system performing encryption for the content provider (such as a third-party trusted system) and to the content receiver (such as a playback device). In some embodiments, the shared secret may be a combination of keys used together, such as a base or domain key embedded in a device, a device key issued for a particular device upon registration, and/or user keys associated with user accounts. DRM systems and methods using encryption keys issued to devices and/or user accounts include those disclosed in U.S. Pat. No. 7,295,673 entitled "Method and System for Securing Compressed Digital Video," U.S. Pat. No. 7,460,668 entitled "Optimized Secure Media Playback Control," and U.S. Pat. No. 7,515,710 entitled "Federated Digital Rights Management Scheme Including Trusted Systems," the disclosures of which are hereby incorporated by reference in their entirety. In a number of embodiments, cryptographic data issued to a user device upon registration includes one or more user keys used to decrypt content and SSL certificates used to authenticate connections to a server. In several embodiments of the invention, the cryptographic data is stored in non-volatile memory on a playback device. Non-volatile memory may include internal system memory, and removable memory such as smart cards or flash drives. Although specific DRM systems are referenced in the above patents, systems and methods in accordance with embodiments of the invention can be utilized in any of a variety of DRM systems.

Cryptographic data issued in the manner described above, however, can be used to create a clone device by copying the cryptographic data onto a similar device. Such devices can be difficult for a DRM system to detect, because the system relies upon the cryptographic data to identify the device. In many embodiments of the invention, cryptographic data issued to a playback device is securely stored on the playback device using a cryptographic key generated using data collected by the playback device concerning the characteristics of the device. The cryptographic key can also be generated using one or more timestamps securely stored on the playback device and/or a separate cryptographic key generated using one or more timestamps securely stored on the playback device. In order to enable a variety of different types or categories of device to operate within the DRM system, the specific pieces of data collected by each different type of playback device to generate the cryptographic key can vary.

As stated above, embedding a unique identifier on a device that exists primarily to facilitate provisioning in the DRM system can be expensive and complex. In operation, a combination of a predetermined set of device characteristics can be sufficiently distinctive as to be uniquely identifying. Device characteristics can be understood as referring to those attributes that are inherent to the device, that were not placed on the device expressly for the purpose of identification in a DRM system. Typically, these attributes are not known by a DRM system to be associated with a particular device before the device has some initial contact (e.g., registering or activating) with the DRM system. Many times, these are attributes of a device or pieces of information that were associated with the device for some other purpose when it was manufactured or when software was loaded onto the device. In some sense, systems and methods in accordance with embodiments of the invention repurpose that information, such that they, alone or in combination with one or more other attributes of the device, provide identifying and/or unique information about the device to a DRM system. In many embodiments, several device characteristics are represented by information about the device that can be obtained from the device or its hardware or software components. Device characteristics can include (but are not limited to) a Media Access Control (MAC) address stored on the device's network interface card (NIC), serial numbers built into chips on the device, serial numbers or license keys of the operating system, BIOS IDs, and product IDs. The specific pieces of data that are utilized to identify the device can differ from one category of device to the next based upon the information available to any given device. In many embodiments, different categories of device use different combinations of device characteristics to generate unique identifiers that share a common predetermined format. In this way, the DRM system can communicate with a device and verify its identity without knowing the type of device.

Device characteristics and the representations of device characteristics in different literal forms can be referred to as device match data. A single piece of device match data that corresponds to a single device characteristic can be referred to as an item of device match data. Where the device match data only includes a single item of device match data, the item effectively is the device match data. In many embodiments of the invention, device match data is collected by a playback device at the time of registration and then utilized to identify the playback device during subsequent transactions with the DRM system. Different devices have different device characteristics and in many instances will have access to different pieces of information for the purpose of generating device match data. In several embodiments, each class of playback device or different product has the ability to generate device match data using a different set of device characteristics. In many embodiments, irrespective of the device characteristics utilized to generate the device match data, the process used to generate the device match data generates device match data that complies with a predetermined format. In a number of embodiments of the invention, a set of cryptographic hash functions is utilized so that the device match data is a standard length across all playback devices irrespective of the characteristics of the playback devices utilized to generate the device match data. The device match data can be utilized to register the playback device with a DRM system. Use of commonly formatted device match data facilitates management of device match data by a registration server and enables the overall DRM system to communicate with devices in a way that is independent of the type of device.

In several embodiments of the invention, device match data can also be used to generate a device protection key used to encrypt cryptographic data stored within the non-volatile memory of the playback device. When the device match data has uniform length, a common process can be utilized to generate an encryption key from the device match data. In several embodiments, the length of the device match data varies between playback devices, and the process for generating a device protection key involves the use of cryptographic hash functions that generate an encryption key of a standard length. When a standard length encryption key is generated, the key can be provided as an input to a common encryption algorithm. In a number of embodiments, multiple encryption keys including the device protection key are utilized to protect the cryptographic data. In several embodiments, a product key is used to encrypt the cryptographic data stored in the non-volatile memory of a playback device and the device protection key is used to encrypt the product key. In yet further embodiments, both the device protection key and the product key are used to encrypt the cryptographic data. Some or all of the device match data can be used to generate the device protection key. The process used to generate the device protection key can be considered a shared secret, known only to the registration server and device.

In a number of embodiments of the invention, a device protection key is generated by a playback device when the device registers with a system or when a device powers on. In some embodiments of the invention, when a playback device attempts to connect to a server or request or play content, or perform another function requiring authentication, it sends its device match data to a server to be verified against the device match data it possessed when it registered. In several embodiments, the device protection key (and/or other keys) is used to securely store timestamps on the playback device. When the playback device attempts to play content that is subject to time based restrictions, a server and/or the playback device can perform a variety of tests utilizing the stored timestamps and playback information concerning the content to detect rollback of the system clock. In a number of embodiments, the DRM system stores a time delta between the playback device system clock and the DRM system clock that can provide a further check to verify the system clock during connected playback.

While certain functions are described herein, uses of device characteristics, device match data, device protection keys, and securely stored timestamps in accordance with embodiments of the invention are only limited to the requirements of a specific DRM and/or content delivery system. Content delivery systems, the use of device match data to authenticate different types of playback devices and to protect encrypted cryptographic data issued to playback devices, and the use of timestamps to validate the system clock of a playback device in accordance with embodiments of the invention are discussed further below.

System Architecture

In many embodiments of the invention, a DRM and/or content distribution system includes devices and servers that utilize device match data to identify devices and bind content to the devices. The devices and servers each have an internal system clock that provides an internal system time (a device time for devices or a server time for servers) to the corresponding device or server. The internal system time is available to applications that run on the device or server, and in many embodiments a call from an application on a device or server can be made to obtain the system time of another device or server via communicating over a network.

In many embodiments, the DRM system supports different classes of playback device and each class of playback device can generate device match data using a different set of device characteristics. In several embodiments, the device match data complies with a standard format including but not limited to the length of the device match data so that common processes can be applied to the device match data irrespective of the type of device that generated the device match data and/or the device characteristics that form the basis of the device match data.

A DRM system, which implements device match data, in accordance with an embodiment of the invention is shown in FIG. 1. Playback devices such as a personal computer 1, television 2 (with or without an attached disk or media player), mobile phone 3, and smart phone 4 possess device characteristics, from which device match data can be derived. Circuits and/or applications on the devices are designed to generate device match data used to verify the device and/or generate a device protection key as described below.

Device match data can be used by a device 1-4 to register with a registration server 5, and used by a device or server 5 to generate a device protection key used to access encrypted cryptographic data. A device can also use device match data to authenticate or verify itself to the server when requesting content from a content server 6. In many embodiments of the invention, devices must also verify device match data before playing back content or performing other restricted functions. Different classes of playback device can utilize different processes to generate device match data. In many embodiments, the process utilized to generate the device match data depends upon the data concerning device characteristics available to the playback device.

A registration server 5 can register playback devices, and store information related to individual user accounts including (but not limited to) cryptographic data, device match data, and information regarding devices registered to a user account such as (but not limited to) a time delta between the system clock of the playback device and various timestamps collected by the playback device related to the playback of specific pieces of DRM protected content. The registration server 5 can use stored device match data associated with each device to act as a reference for verification of the device and can use stored timestamps to detect attempts to circumvent time based restrictions on DRM protected content by rolling back the playback device's system clock.

Playback Devices

Figure 2:
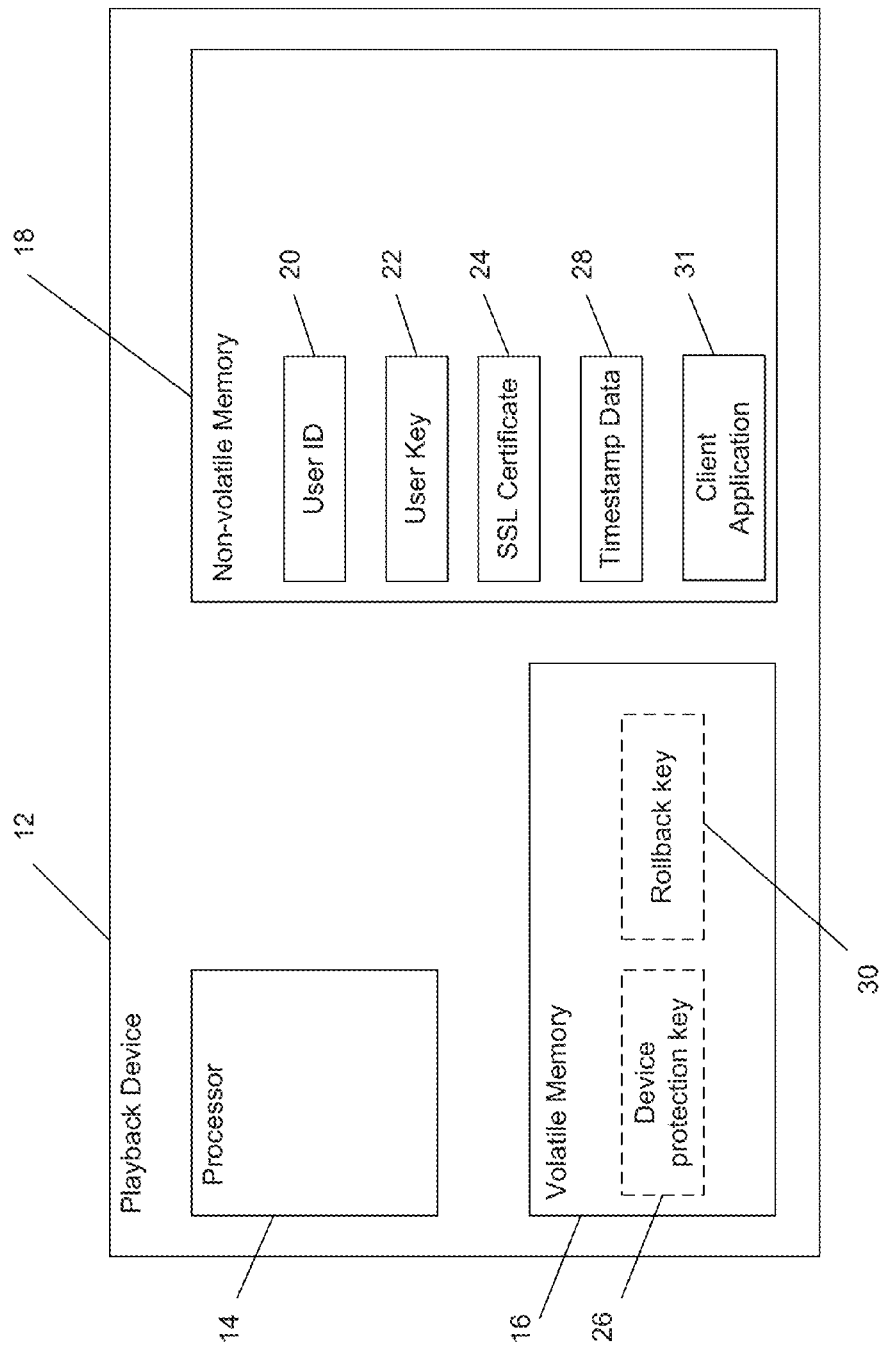
FIG. 2 conceptually illustrates a playback device, which is configured to store encrypted cryptographic data used to decode content, and timestamps, and that is configured to generate a cryptographic key to access the cryptographic data in accordance with an embodiment of the invention.

In many embodiments of the invention, playback devices are configured to generate device match data by gathering information concerning the characteristics of the playback device. In operation, the information concerning device characteristics available to a playback device typically depends upon the type of playback device. Depending upon the type of playback device, information concerning specific device characteristics is collected and utilized to generate device match data. In many embodiments, the length and/or format of the device match data is uniform across all categories of playback device. The device match data can then be utilized to register the playback device and to generate a device protection key, which is used to access encrypted cryptographic data stored on the playback device, using a common process irrespective of the type of playback device. A playback device in accordance with an embodiment of the invention is shown in FIG. 2. The playback device can be used to generate device match data and a device protection key to access encrypted cryptographic data using, for example, a process similar to the processes illustrated in FIGS. 4 and 5 (see discussion below). The playback device can also record timestamps related to the playback of specific pieces of DRM protected content and generate a rollback key to access the encrypted cryptographic data. The playback device 12 includes a processor 14, volatile memory 16, and non-volatile memory 18. Cryptographic data, which can be used to decrypt encrypted data or create secure connections to other systems, is stored in the non-volatile memory. In various embodiments, non-volatile memory can include removable memory, such as memory on smart cards or flash drives that is accessible to the playback device when the removable memory is connected to the device. In many embodiments, the cryptographic data includes (but is not limited to) a user ID 20 that is a unique identifier for a user account, a user key 22 used in decryption of content, and a SSL certificate 24 used in creating secure connections with other devices via Hypertext Transfer Protocol Secure (HTTPS). HTTPS is a combination of the Hypertext Transfer Protocol (HTTP) with Secure Sockets Layer/Transport Layer Security (SSL/TLS) protocol to provide encrypted communication and secure identification of a network device. In other embodiments, any of a variety of identifiers, keys, certificates and other types of information can be stored as cryptographic data on a playback device. The non-volatile memory 18 can also be utilized to store the processor instructions utilized to configure the playback device to perform processes in accordance with embodiments of the invention. In other embodiments, the playback device software and/or firmware can be stored in any of a variety of computer readable media appropriate to a specific application.

In many embodiments of the invention, the cryptographic data is obtained from a registration server at the time the playback device is registered with a DRM system. In a number of embodiments, the registration process involves the collection of device match data by the playback device and the device match data and/or information derived using the device match data is provided to the registration server. Both device match data and information derived from device match data can be and are collectively referred to herein as device match data.

In several embodiments of the invention, the cryptographic data issued by the registration server is encrypted using a unique device protection key that is generated using the device match data as described below. When the playback device accesses the encrypted cryptographic data, the processor collects the device data match data and generates the device protection key 26. During operation, the device protection key 26 can be stored in volatile memory 16 for temporary use. In the event that the device match data changes due to a change in the device characteristics or due to an attempt to clone a playback device, the registration server can decide whether to issue new cryptographic data to the playback device (i.e. re-register the device) or to deny the playback device's request. In this way server heuristics can be utilized to accommodate changes in the processes and/or pieces of information utilized to generate device match data. The server can re-register the device and the user is unaware that a modification has been performed with respect to the manner in which encrypted cryptographic data is stored on the playback device. The software utilized to configure the processor is typically stored in the non-volatile memory or firmware of the playback device. However, in many embodiments, the software can be stored on other forms of storage including (but not limited to) a hard disk drive.

In many embodiments of the invention, a playback device stores timestamp data 28 in non-volatile memory 18. The timestamp data 28 includes timestamps and related information, and can be used to generate a rollback key 30 as will be discussed further below. Timestamps record various playback and program events that can be used to later verify that the device clock has not been tampered with.

In various embodiments of the invention, a client application 31 is stored in non-volatile memory containing instructions for implementing playback and/or processes utilizing device match data and/or timestamps including the processes described further below.

Although a specific playback device is illustrated in FIG. 2, any of a variety of playback devices configured to store encrypted cryptographic data and to collect information concerning device characteristics can be utilized in accordance with embodiments of the invention. The collection of timestamps by playback devices for the purpose of detecting rollback of the system clock in accordance with embodiments of the invention is discussed below.

Timestamps and Collecting Timestamp Data

As discussed above, devices and servers have internal system clocks and can record the time of certain events. Timestamps can be stored on a device for use in generating a rollback key used to encrypt cryptographic data and/or validating the device clock using an anti-rollback algorithm as will be discussed further below. Timestamps may be specified with respect to events on a playback device or a specific playback application on a playback device, or even to specific pieces of content.

A timestamp on a device can be updated with a new value obtained from the device's system clock (device clock). Timestamps can include a "last program run" timestamp that indicates the last time the device launched the playback application. The timestamp can be updated when the application is open or when the application is closed. A "last file played" timestamp can indicate the last time the device played a file or protected content. The timestamp can be updated at the commencement or the completion of playback. A "last server connection" timestamp can indicate the most recent time the device connected to a server. The timestamp may indicate the connection to any server, to a certain type of server (e.g., DRM server, content server), or to a specific server. A "server time delta" can indicate the difference between the device time and a server time at a particular instant. The time delta can be used to account for the skew or difference between the system clocks of a device and a server and/or network latencies. The server time may be requested from the server by the playback device or may be sent by the server without a request. In various embodiments of the invention, the server time can be sent in a separate communication to the device, or can be included in various communications such as a registration confirmation or embedded in a content file. Validation of the timestamps or the device clock can consider whether this delta is consistent or within an expected range. A "run counter" can increment when a particular piece of content or any content is played in disconnected playback mode (i.e., the device is not in direct communication with a server), or alternatively every time the playback application is run, and reset to zero when a connection is made to a server within the DRM system. The specific condition that increments the run counter can be dependent on the design or operation of the DRM system. In several embodiments, timestamps can be recorded with respect to the playback of a specific piece of content including start time, and end time for a specific period of continuous playback and the duration of the content played back during that time period.

While the timestamps discussed above are defined for a device or for a playback application, a variety of other timestamps may pertain to a specific piece of content. In several embodiments of the invention, content-specific timestamps can include (but are not limited to) the last (most recent) start time, last end time, and/or playback duration of a piece of content. These various timestamps can be used for various functions including detecting rollback by comparison to the device system clock and enforcing playback restrictions.

Timestamps may be stored in a variety of formats. In many embodiments, Unix time, or POSIX time, is used. Unix time is defined as the number of seconds elapsed since midnight Coordinated Universal Time (UTC) of Jan. 1, 1970. A timestamp expressed in Unix time may be, for example, a 64 bit signed integer.

A set of timestamps or part of a set of timestamps stored on a device can be referred to as timestamp data. Timestamp data can be used to generate a string of predetermined length, referred to as a rollback key, from timestamp data using a cryptographic hash function or similar function. The rollback key can be updated when timestamps are updated or upon other memory access events. As will be discussed further below, a rollback key can be used to encrypt cryptographic data, can be used as key material to generate another encryption key, and can be further combined with other encryption keys or key material to create a single encryption key that can be used to encrypt cryptographic data. Timestamps and playback restrictions pertaining to specific content files are discussed below.

Timestamps and Playback Restrictions within a Content File

Timestamps and/or playback restrictions may also be stored in a content file and relate to that content file. Many of the timestamps described above with respect to a playback application or a playback device can also be applied to a specific piece of content. In addition, other useful timestamps can be embedded in a content file (e.g., within a DRM header). For example, a server may embed its system time in a content file sent to a playback device. The playback device can use this server time to calculate a server time delta that is stored as a timestamp as discussed above.

Playback restrictions, also referred to as time-limiting rules, can be rules that govern the playback of certain files. For instance, a piece of content may be acquired as a rental. Playback restrictions can stipulate that the content may be viewed only within a two day period and/or only a maximum of three times (by way of example). The rules can be stored as fields or other identifiable pieces of information within a content file (e.g., within a DRM header) and interpreted by a playback device to allow playback pursuant to the rules. Playback restrictions can include (but are not limited to) an allowable playback time, a content run counter and limit, and server connection requirements.

An allowable playback time may be specified for a period or "window" of time when playback of the content may be permitted. The allowable playback time may be given in various ways, including as absolute time (e.g., a begin time and end time in POSIX format) or as a period of time from first playback (e.g., a period of 3 days from first playback).

A content run limit may specify the maximum number of views, or the maximum run count, that is allowed for a piece of content. Its value may be any number greater than zero, or unlimited (i.e., no limitation on number of times the piece of content can be viewed). A content run counter may be stored on a playback device to track the number of times the content has been viewed and used to compare to the maximum run count.

Server connection requirements may specify rules that must be satisfied in order to keep the content valid. The rules may include (but are not limited to) when the device must connect to a server, how often the device must connect to a server, or the amount of time allowed to pass before the device connects to a server. Various conditions may be imposed if the rule is violated, including (but not limited to) denying playback, limiting the playback time, limiting the playback to a lower resolution, replacing playback of content with a shortened version or trailer of the content, expiring the content, or erasing the content.

Registration of playback devices using device match data and the use of device match data to access encrypted cryptographic data issued by a registration server are discussed further below.

Registration of Playback Devices

Figure 3:
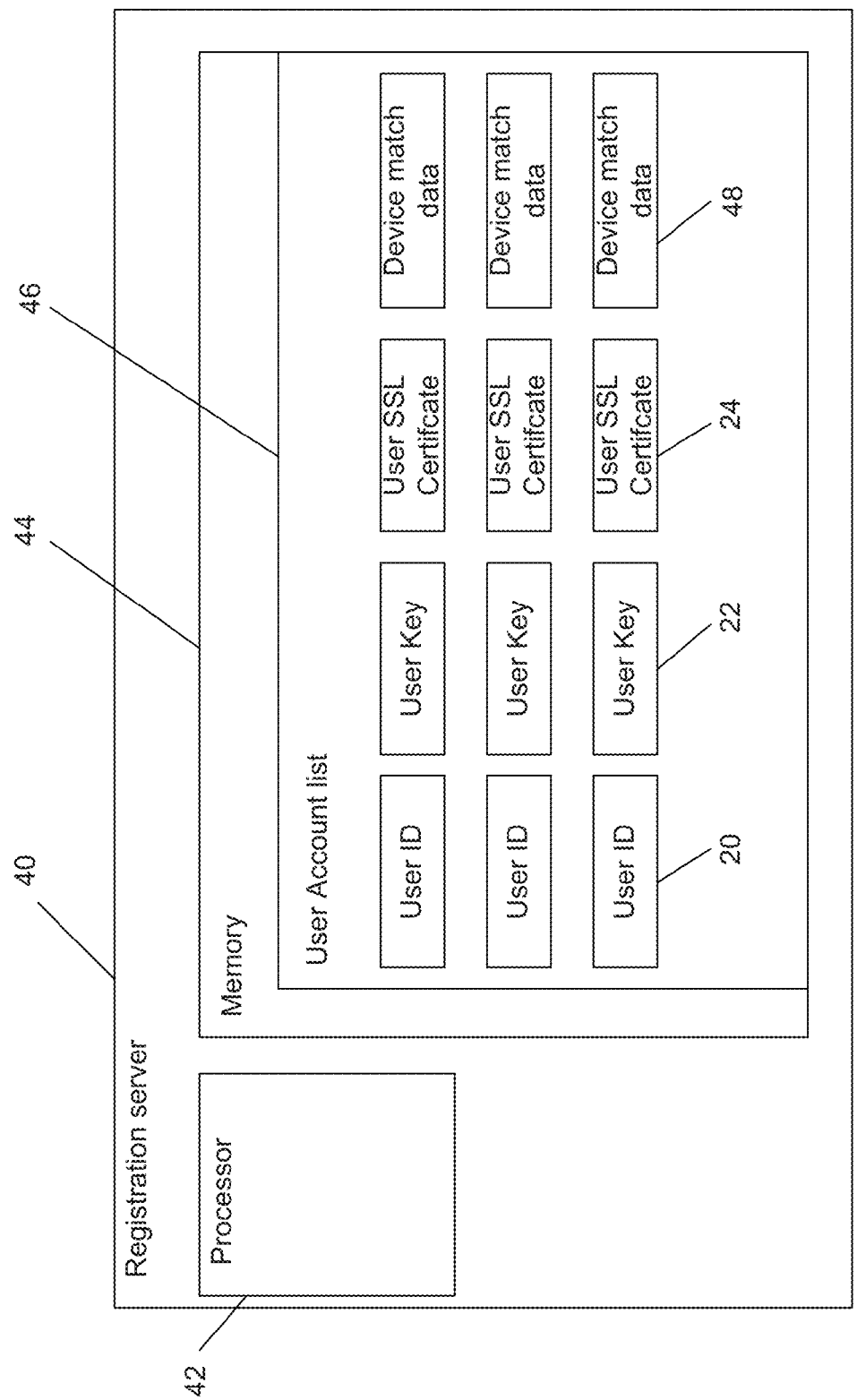
FIG. 3 conceptually illustrates a registration server, which stores information related to user accounts including (but not limited to) cryptographic data, in accordance with an embodiment of the invention.

In many embodiments of the invention, a registration server registers playback devices, and stores information related to individual user accounts including (but not limited to) cryptographic data and information regarding devices registered to a user account. A registration server, in accordance with an embodiment of the invention is shown in FIG. 3. The registration server 40 has a processor 42 and memory 44, in which a user account list 46 is maintained. Although the user account list is shown in FIG. 3 as being stored in memory, in many embodiments of the invention user account information can be stored in any form (including but not limited to) a database and on any form of machine readable media. The user account list 46 contains identifying and cryptographic data for user accounts in the system, such as a user ID 20, user key 22, and/or SSL certificate 24 for each user account. The user account list also stores device match data 48 of devices associated with each user account. Although the user account illustrated in FIG. 3 includes specific pieces of information stored with respect to each user account, the specific user account information maintained by a registration server in accordance with embodiments of the invention is typically only limited by the requirements of a specific application.

In many embodiments of the invention, a device performs an initial procedure to compute and store device match data. In several embodiments, different procedures are utilized by different types of device. In a number of embodiments of the invention, the registration server receives and stores device match data from a playback device during a registration process. The use of stored device match data to verify a particular device when it sends current device match data as part of a verification process in accordance with embodiments of the invention is discussed further below. In yet further embodiments of the invention, the registration server creates a device protection key from device match data and sends cryptographic data encrypted with the device protection key to a device. In other embodiments, the registration server securely sends the encrypted cryptographic data to a playback device and the playback device encrypts the cryptographic data using at least a device protection key generated using the device match data.

Although a specific registration server is illustrated in FIG. 3, any of a variety of servers configured to issue encrypted cryptographic data to playback devices and store user account information including device match data appropriate to a specific DRM system can be utilized in accordance with embodiments of the invention. Processes for generating device match data from device characteristics in accordance with embodiments of the invention are discussed further below.

Generating Device Match Data

In many embodiments of the invention, device match data can be raw data that represents a device characteristic or a set of various device characteristics. In several embodiments of the invention, device match data can also be formatted as a hash value or some other function of the raw data representing the device characteristic or characteristics. For example, a unique attribute can be a MAC address whose raw data value is six groups of two hexadecimal digits. A unique attribute can also be the license key for software on the device whose raw data value is an alphanumeric string. In many embodiments, the device match data is a combination of unique characteristics. Because the raw data values in a set of device match data may be long and of differing lengths, it is desirable to use representations that are shorter and of uniform length. Such representations can be achieved by many methods, one of which is a cryptographic hash function.

A cryptographic hash function is a procedure or algorithm that takes an arbitrary block of data and returns a fixed-size bit string, the hash value, such that an accidental or intentional change to the data will change the hash value. A cryptographic hash function typically has four significant properties: it is easy to compute the hash value for a given input value, it is infeasible to generate an input value that has a given hash value, it is infeasible to modify an input value without changing the resulting hash value, and it is infeasible to find two input values with the same hash value. In many embodiments, device characteristics are represented and used as device match data by passing raw data representative of at least one device characteristic through a cryptographic hash function to determine a hash data value that is uniform in length and unique. This corresponding hash data value, being as unique as the raw source data, is just as representative of the device characteristic(s) as the raw data. Therefore, the hash value is device match data, a more concise and usable form of representing a device characteristic. As noted above, providing device match data having common formatting and/or length enables common processes to be applied to the device match data irrespective of the device type and/or device characteristics utilized to generate the device match data.

Processes for registering devices with a registration server and for generating device protection keys using device match data in accordance with embodiments of the invention are discussed further below.

Processes for Generating Device Match Data and Device Protection Keys on Playback Devices In many embodiments of the invention, a device performs an initial procedure to compute and store device match data as a reference set for future verification. The stored reference set can also be referred to as stored or registered device match data.

Figure 4:
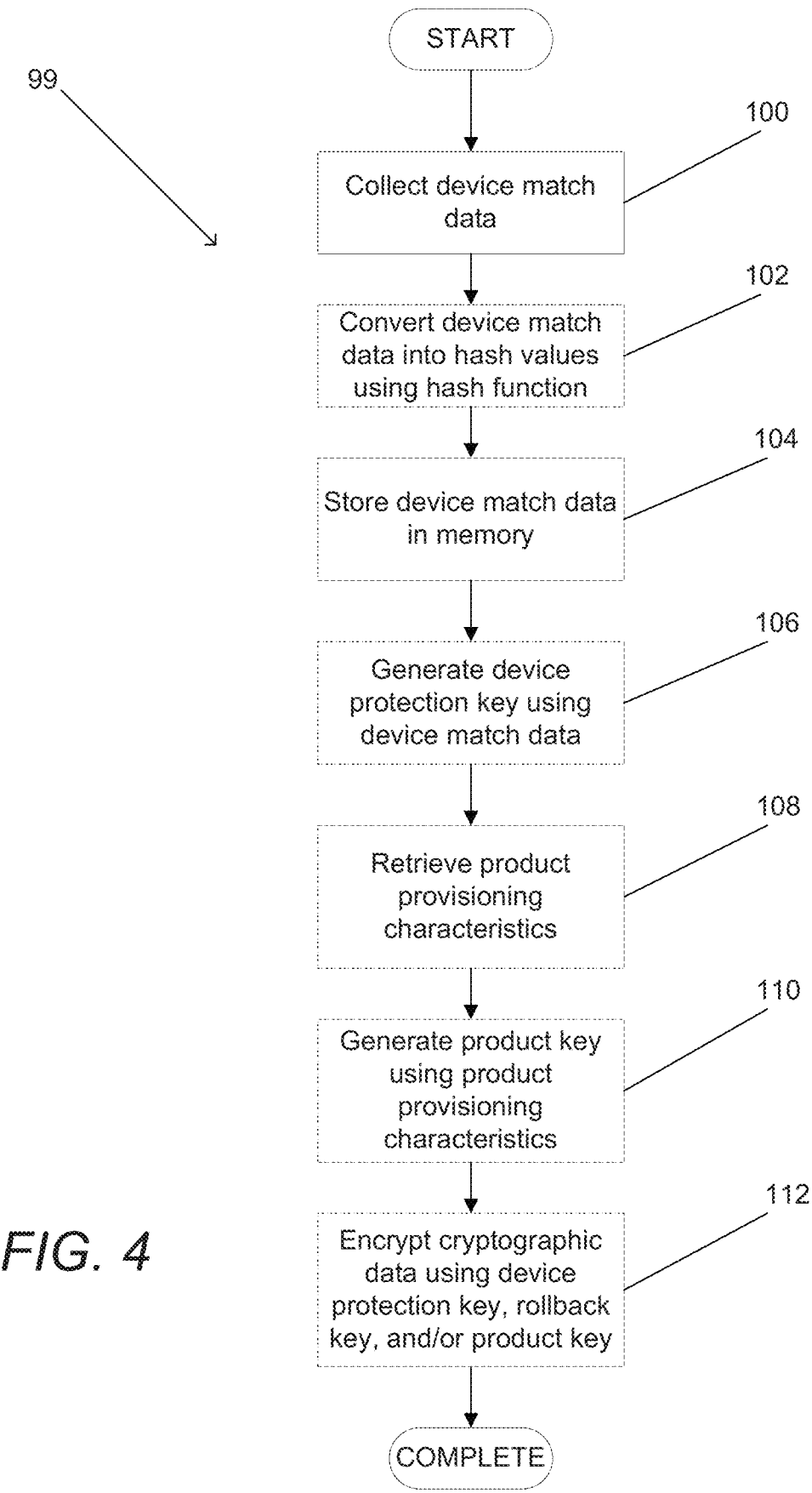
FIG. 4 is a flow chart illustrating a process for computing, processing, and storing device match data and protecting cryptographic data using device match data, in accordance with an embodiment of the invention.

A flow chart illustrating a process for computing and storing device match data on a device and protecting cryptographic data using device match data, in accordance with an embodiment of the invention is shown in FIG. 4. The process 99 involves discovering or collecting (100) device match data that represents device characteristics from its hardware and/or software components. Items that may be collected can include a Media Access Control (MAC) address stored on the device's network interface card (NIC), serial numbers built into chips on the device, serial numbers or license keys of the operating system, BIOS IDs, and/or other information that alone or in combination can be utilized to uniquely identify the device. Generally, these items are discoverable and can be read from memory or requested by polling or sending an instruction to a component within the playback device. In several embodiments, the discoverable data may be processed via a function such as (but not limited to) a hash function as part of the discovery process. In this way, an item of device match data may in fact be a hash of a piece of information that is discoverable within the playback device. As noted above, device match data can be a single item or a combination of multiple items of device match data.

The device can use one or more cryptographic hash functions to derive (102) hash values for items of device match data. As discussed above, hashing preserves the uniqueness of each item of device match data while converting it into a form that is more efficient and uniform.

The items of device match data are stored (104) in the clear or in an encrypted form. A device match data identifier (DMD ID) can be associated with each item of device match data to describe the attribute it represents and distinguish the item from others that describe other attributes of the device.

In further embodiments of the invention, cryptographic data on the device can be encrypted using a device protection key derived from device match data. The device uses device match data to generate (106) a device protection key. Cryptographic data on the device is then encrypted (112) using the device protection key. In further embodiments of the invention, a rollback key can be derived from timestamp data and used in combination with a device protection key to encrypt the cryptographic data. Generating a rollback key is discussed in greater detail further below.

In yet further embodiments of the invention, it may be desirable to implement more levels of protection by using additional encryption keys, such as a product key derived from product provisioning characteristics, when encrypting the cryptographic data. A DRM system may associate additional proprietary information with devices, such as identifiers for device models, classes, or product lines. Identifiers can be specific to hardware configurations, software configurations, or combinations of hardware and software. The identifiers and other data may be relevant to how the device is provisioned and/or categorized in the DRM system. These identifiers and other information can be collected (108) from the device as product provisioning characteristics. Systems and methods for identifying devices and securing cryptographic data using product provisioning characteristics include those disclosed in U.S. patent application Ser. No. 13/436,888 entitled "Systems and Methods for Identifying Consumer Electronic Products Using a Playback Device with a Product Identifier," filed on Mar. 31, 2012, the disclosure of which is hereby incorporated by reference in its entirety.

Therefore, the device can also use product provisioning characteristics to generate (110) a product key that can be utilized in the encryption (112) of the cryptographic data. In some embodiments, product provisioning characteristics may be unique only to a particular device model or product line, and already assigned to that class of device. It follows that a product key may have already been determined and assigned to the class of device possessing those product provisioning characteristics.

Although a process is described above with reference to FIG. 4 in which a playback device generates both device match data and a device protection key locally, in many embodiments a server can generate a device protection key remotely and use the remotely generated device protection key in the encryption of cryptographic data provided to the playback device during registration. Generating device match data on a device and generating a device protection key using a server in accordance with embodiments of the invention are discussed further below.

Processes for Generating Device Match Data Using Playback Devices and Generating Device Protection Keys Using Servers A playback device in accordance with embodiments of the invention registers with a registration server and acquires credentials (e.g., the cryptographic data) used in decrypting and/or decoding DRM protected content. In several embodiments of the invention, device match data provided to a server by a playback device is stored or associated with a user account when a device registers with a registration server in a DRM system.

Figure 5:
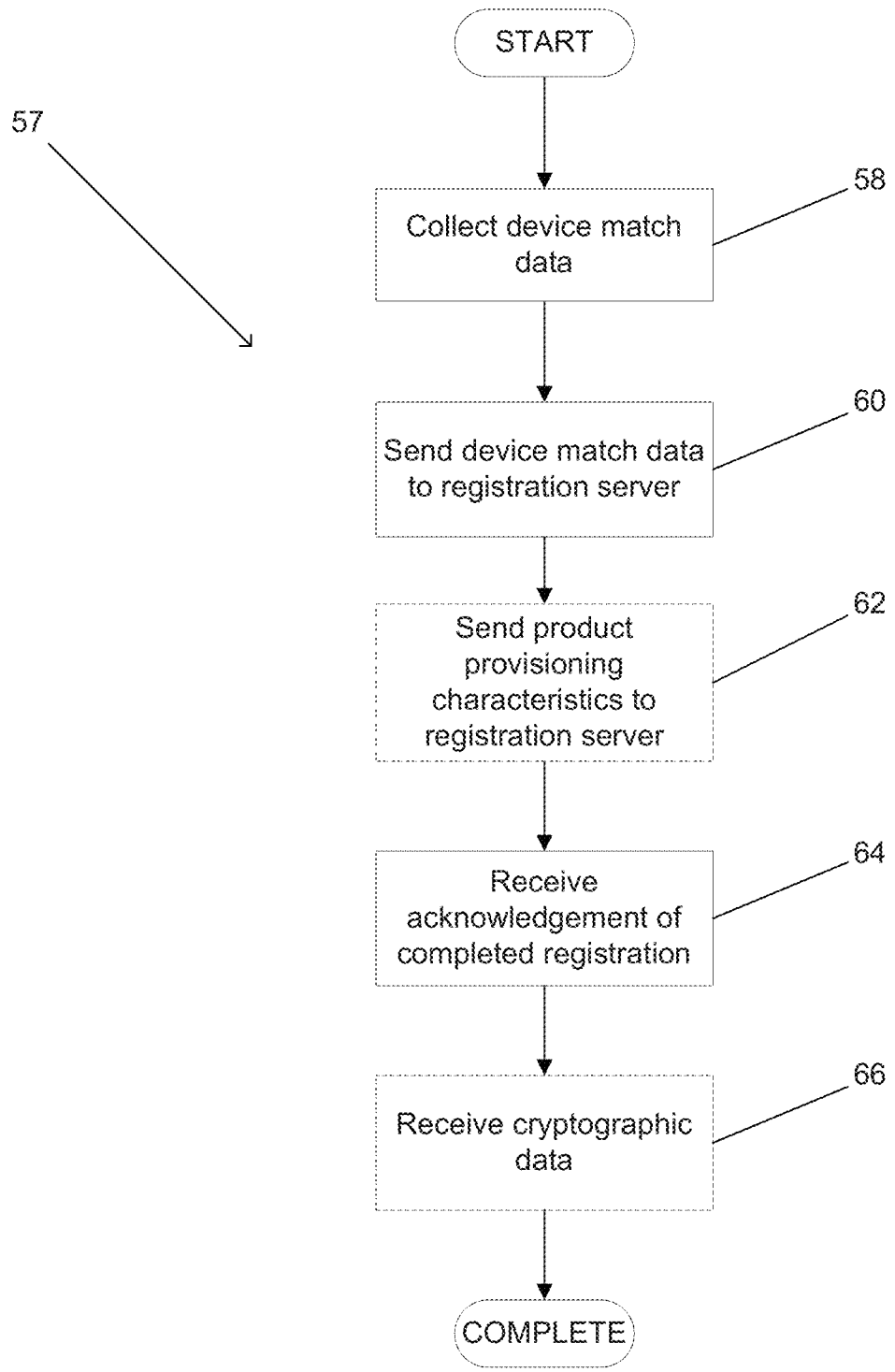
FIG. 5 is a flow chart illustrating a process that can be used for a playback device to send device match data when it registers with a registration server, in accordance with an embodiment of the invention.

A process for registering with a registration server using device match data, in accordance with an embodiment of the invention is shown in FIG. 5. The process 57 includes discovering or collecting (58) device match data from hardware and/or software components of a playback device. The playback device sends (60) its device match data to the registration server. In some embodiments, the playback device hashes the device match data before they are sent to the registration server. If the DRM system utilizes product provisioning characteristics which are stored on the playback device (discussed above), they can also be sent (62) to the registration server by the playback device.

In many embodiments of the invention, the registration process involves sending encrypted cryptographic data from the server to the device. In several embodiments of the invention, the cryptographic data is encrypted using a device encryption key. As described below, the registration server can use device match data to generate a device protection key and encrypt cryptographic data for the playback device using the device protection key and/or product key. The playback device receives (66) the encrypted cryptographic data, which may be encrypted with a device protection key and/or product key, from the registration server. The encrypted cryptographic data is written to non-volatile memory or otherwise stored on the device.

Figure 6:
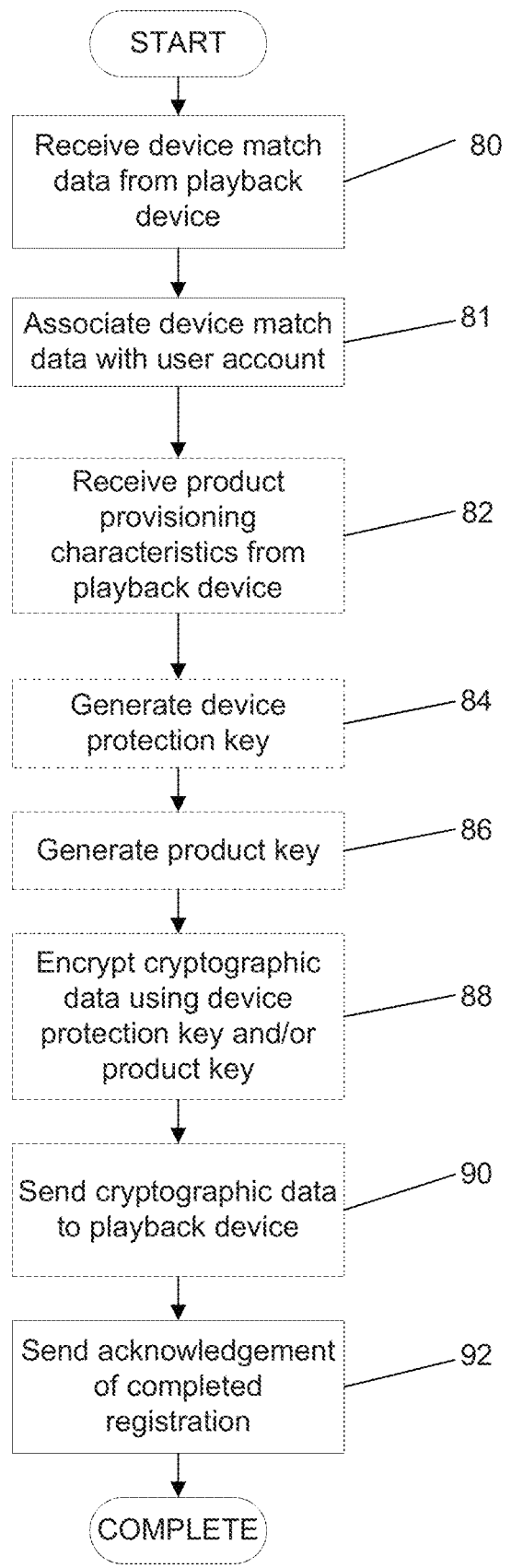
FIG. 6 is a flow chart illustrating a process that can be used for a registration server receiving device match data during the registration of a device, in accordance with an embodiment of the invention.

In many embodiments of the invention, a registration server receives and stores device match data during device registration. A flow chart illustrating a process that can be used by a registration server receiving device match data during the registration of a device, in accordance with an embodiment of the invention is shown in FIG. 6. The server receives (80) device match data from a playback device that is attempting to register with the server. The device match data may be hashed or raw device match data. In the illustrated embodiment, the device match data is stored (81) in a user account list and associated with the user account that the device is registering under. In other embodiments, any of a variety of data storage techniques appropriate to a specific application can be utilized to associate device match data with a specific user account. The server can also receive product provisioning characteristics such as a product identifier from the playback device (82). In several embodiments, the server uses the device match data to generate a device protection key specific to the device (84) and encrypts (88) the cryptographic data using the device protection key. In other embodiments, the server securely transmits the encrypted cryptographic data to the device and the playback device locally generates the device protection key and uses it to encrypt its copy of the cryptographic data.

In some embodiments it may be desirable to implement more levels of protection by using additional encryption keys, such as a product key, when encrypting the cryptographic data. Therefore, the server can also use product provisioning characteristics to generate a separate product key (86) that can be utilized in the encryption (88) of the cryptographic data either on the server or on the playback device.

The encrypted cryptographic data is sent to the playback device (90). While the process described assigns cryptographic data to one playback device, in several embodiments the same cryptographic data can be issued to multiple devices registered under the same user account with the registration server. In several embodiments, an acknowledgement of completed registration is sent to the playback device (92).

Although specific registration processes are described above, any of a variety of registration processes that utilize device match data can be utilized in accordance with embodiments of the invention. Processes for generating a rollback key using timestamp data are discussed further below.

Generating a Rollback Key Using Timestamp Data

As discussed above with respect to device match data, a cryptographic hash function can take an arbitrary block of data and return a fixed-size bit string. A cryptographic hash function can be used to generate a device protection key using some or all of a set of device match data. Similarly, timestamp data (a set of timestamps) can be input to a cryptographic hash function to generate a rollback key. As can readily be appreciated, many of the methods described above for generating device protection keys can also be utilized to generate rollback keys. Moreover, keys can constitute key material that can combined, hashed, and used to create a single key or set of key material. In several embodiments of the invention, a device protection key derived from device match data and a rollback key derived from timestamp data can be combined and hashed to produce a single key that can be used to encrypt and/or decrypt a set of cryptographic data. One can understand that various embodiments of the invention can use various encryption schemes with different combinations of keys and order of encryption steps using different keys.

The device protection key and/or rollback key can themselves be securely stored, such as being encrypted with a key or combination of keys. In several embodiments of the invention, a product key and/or other keys are used to encrypt the device protection key and/or rollback key.

Figure 7A:
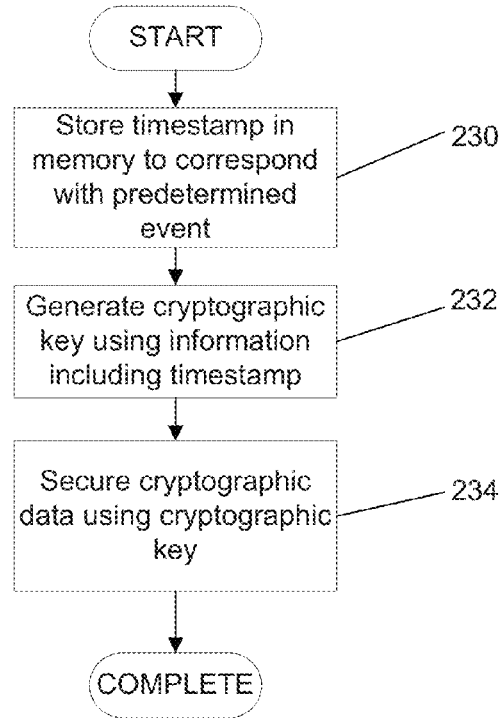
FIG. 7A is a flow chart illustrating a process for storing timestamps and protecting cryptographic data using timestamps, in accordance with an embodiment of the invention.

In many embodiments of the invention, timestamps can be used in processes to secure cryptographic data. A process for encrypting cryptographic data using timestamps in accordance with an embodiment of the invention is shown in FIG. 7A. A playback device stores (230) one or more timestamps in memory in response to the occurrence of at least one predetermined event. The value of each stored timestamp is based on the current time of the device clock when the event occurs. The device generates (232) a cryptographic key using information including the stored timestamp(s). As discussed above, device match data or a device protection key may also be utilized in creating the cryptographic key. The device encrypts (234) the cryptographic data using the cryptographic key.

Figure 7B:
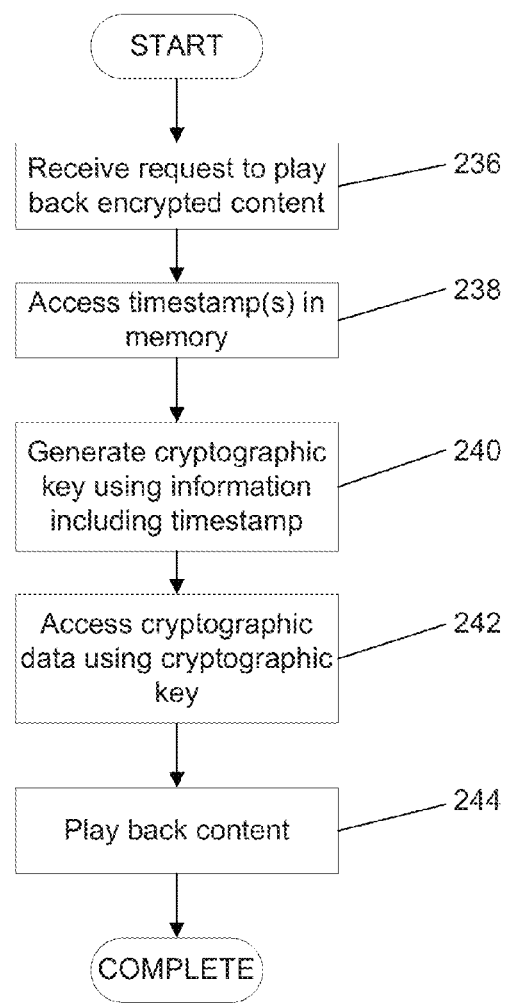
FIG. 7B is a flow chart illustrating a process for accessing cryptographic data using timestamps, in accordance with an embodiment of the invention.

A process for decrypting cryptographic data using timestamps in accordance with an embodiment of the invention is shown in FIG. 7B. A playback device receives (236) a request to play back encrypted content. In many embodiments, the request is received via a user instructions executed through a user interface on the device. The device accesses (238) one or more timestamps in memory. The device uses information including the timestamp(s) to generate (220) a cryptographic key. The device accesses (242) encrypted cryptographic data using the cryptographic key. Using the cryptographic data, the device plays back (244) the requested content. Typically, the information and the key generation algorithm used will correspond to the encryption process used to secure the cryptographic data.

Processes for accessing encrypted cryptographic data issued to a registered playback device and encrypted with a device protection key generated using device match data and/or a rollback key generated using timestamp data in accordance with embodiments of the invention are discussed further below.

Accessing Encrypted Cryptographic Data Protected Using a Device Protection Key and a Rollback Key In many embodiments of the invention, encrypted cryptographic data on a playback device is protected using a device protection key. In several embodiments, the technical protection utilized by the playback device utilizes a combination of keys including (but not limited to) a device protection key, a rollback key, and a product key. Accessing the encrypted cryptographic data thus involves recovering the device protection key and any other keys that may be used to protect the encrypted cryptographic data.

Figure 8:
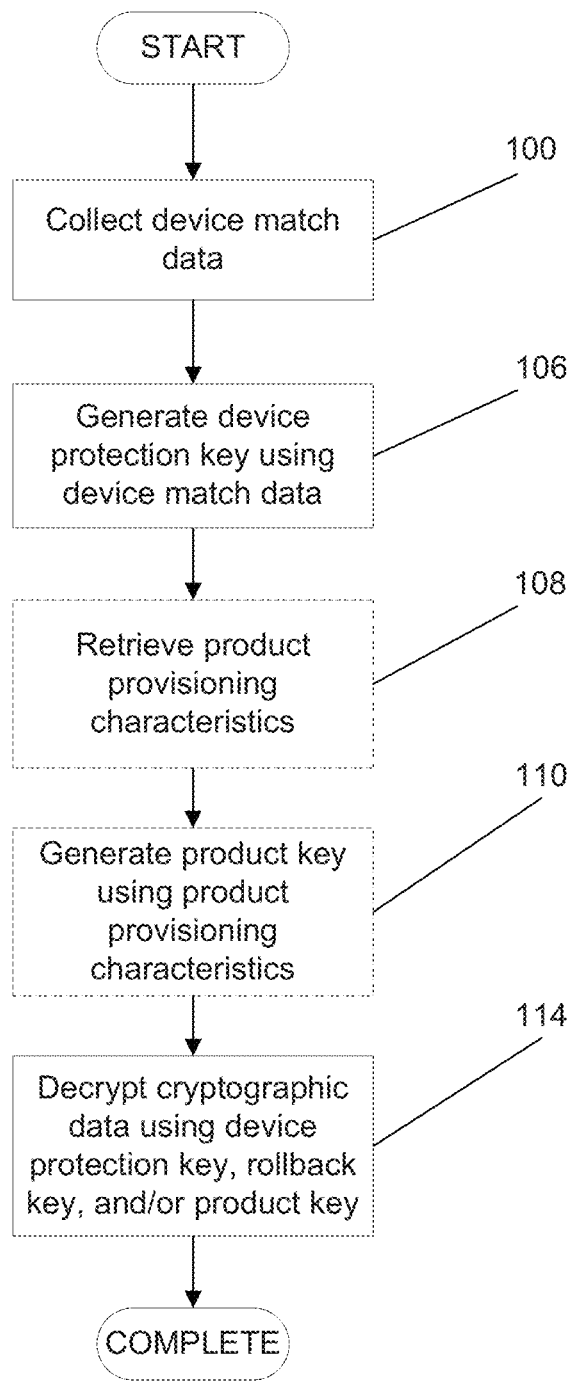
FIG. 8 is a flow chart illustrating a process to access encrypted cryptographic data using a device protection and/or product key in accordance with an embodiment of the invention.

A process for accessing encrypted cryptographic data protected using a device protection key in accordance with an embodiment of the invention is shown in FIG. 8. Many steps are analogous to encrypting the cryptographic data. The device collects (100) device match data from its hardware and/or software components. A device protection key is generated (106) using the device match data. In many embodiments, product provisioning characteristics can be retrieved (108) and used to generate (110) a product key. Provided that the encrypted cryptographic data resides on the device that it was intended and encrypted for (i.e., the device match data used to generate the key is the same), the encrypted cryptographic data can be decrypted (114) using the device protection key, rollback key, and/or the product key. Discussed further below are algorithms that can recognize changes in device match data that are determined to be minor and permissible, and allow the encryption of the cryptographic data to be refreshed or updated using newer device match data and/or timestamps.

Although a specific process is discussed above with respect to FIG. 8, any of a variety of processes for accessing encrypted cryptographic data protected using a device protection key generated using device match data can be utilized in accordance with embodiments of the invention. Processes for verifying registered playback devices using their device match data in accordance with embodiments of the invention are discussed further below.

Verification of Device Match Data

Figure 9:
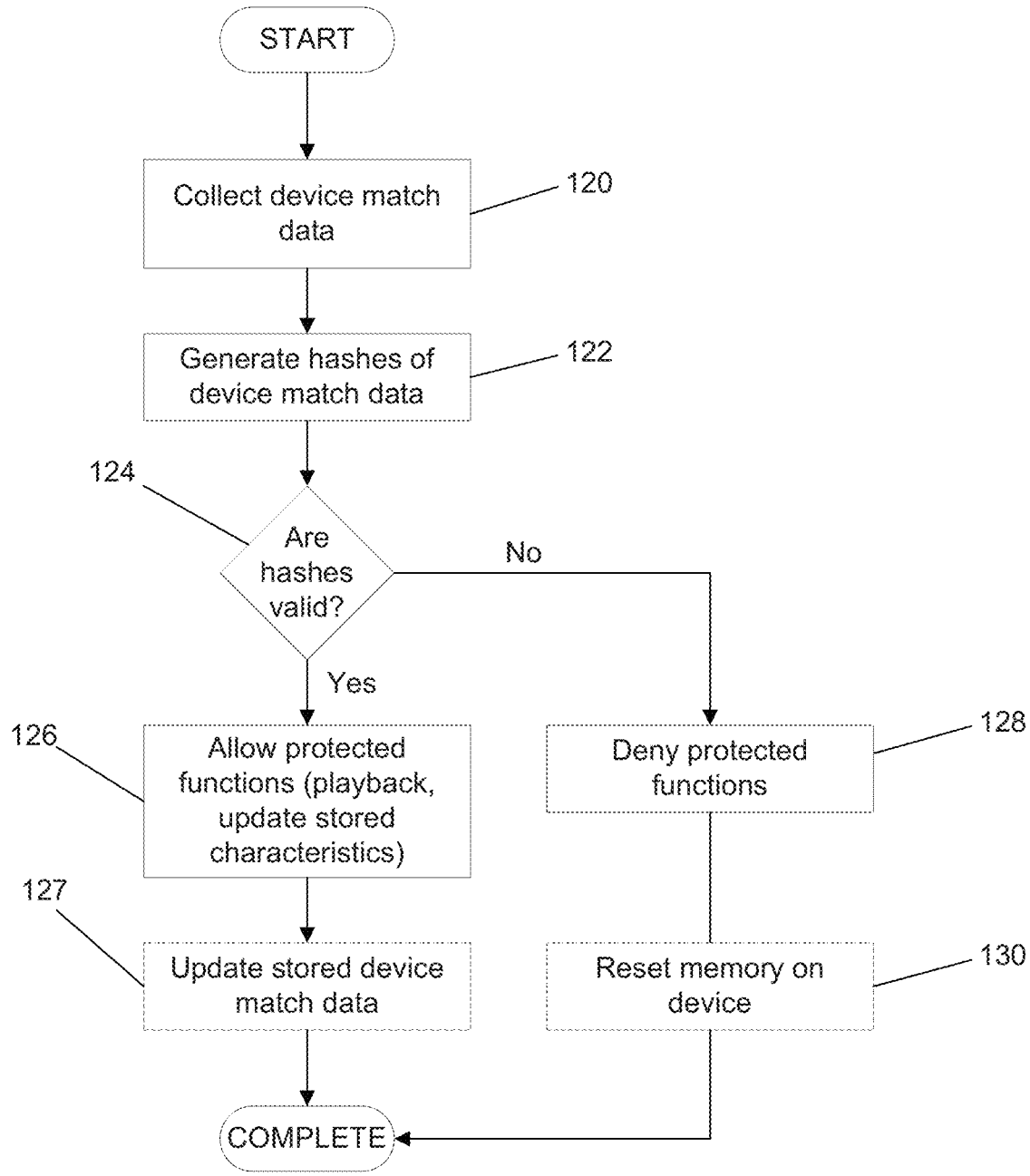
FIG. 9 is a flow chart illustrating a process for verifying device characteristics in accordance with an embodiment of the invention.

Verification of device match data can be useful to detect and prevent tampering with a device's memory and/or the cloning of devices. In the absence of a server, a device can self-verify its device match data. In many embodiments of the invention, a device may verify its device characteristics, for example, during a power-on operation, when content is played, or when content is requested. A process for verifying device characteristics in accordance with an embodiment of the invention is shown in FIG. 9. The device discovers or collects (120) device match data from its hardware and/or software components, as described above. The device uses one or more cryptographic hash functions to derive (122) hash values of the device match data. The hash function(s) used should be the same as those used to generate the stored hash values. The hash values are compared (124) to those stored on the device using a matching algorithm. Device characteristic identifiers can be used to identify corresponding values.

A matching algorithm can take a variety of forms in determining a match. For example, a simple algorithm can give a positive match if merely two items of device match data result in the same hash value. A more complex algorithm can weigh certain items of device match data or give different consideration to other items of device match data.

If the matching algorithm determines a positive match, the protected functions are allowed (e.g., playing back or requesting content) (126). Furthermore, the device match data stored in memory can be updated (127) with the current values. If there is no match, the protected functions are denied (128). The memory on the device can be reset (130) so that it is treated as a new device in the DRM system or other corrective measures can be taken.

In further embodiments of the invention, additional matching algorithms can be utilized to allow an evolution in device characteristics. Changes in some device characteristics may indicate suspicious activity, while changes in other device characteristics could be benign and typical to the normal operation of the device. For example, a change in the BIOS ID of a device and MAC address of a device could likely indicate that the memory was cloned from one device to another. Such a use may be prohibited by a DRM system and therefore blocked. On the other hand, a change in attributes such as the operating system version may simply be a software update to the current version appropriate for the device and permissible in the DRM system. A matching algorithm can implement logic that permits certain combinations of device characteristics to change and be updated to current values, and recognizes other combinations as suspicious. Similarly, in embodiments where a device stores device match data, a device can run such algorithms to recognize changes that are considered minor (such as updating system software) and allow device match data that is stored to be updated to current values. In many embodiments of the invention where a device stores encrypted cryptographic data that is encrypted with a device protection key that is generated with device match data, such algorithms can be used to recognize changes that are considered minor (such as updating system software), generate a new device protection key using current values, and re-encrypt the cryptographic data using the new device protection key.

Figure 10:
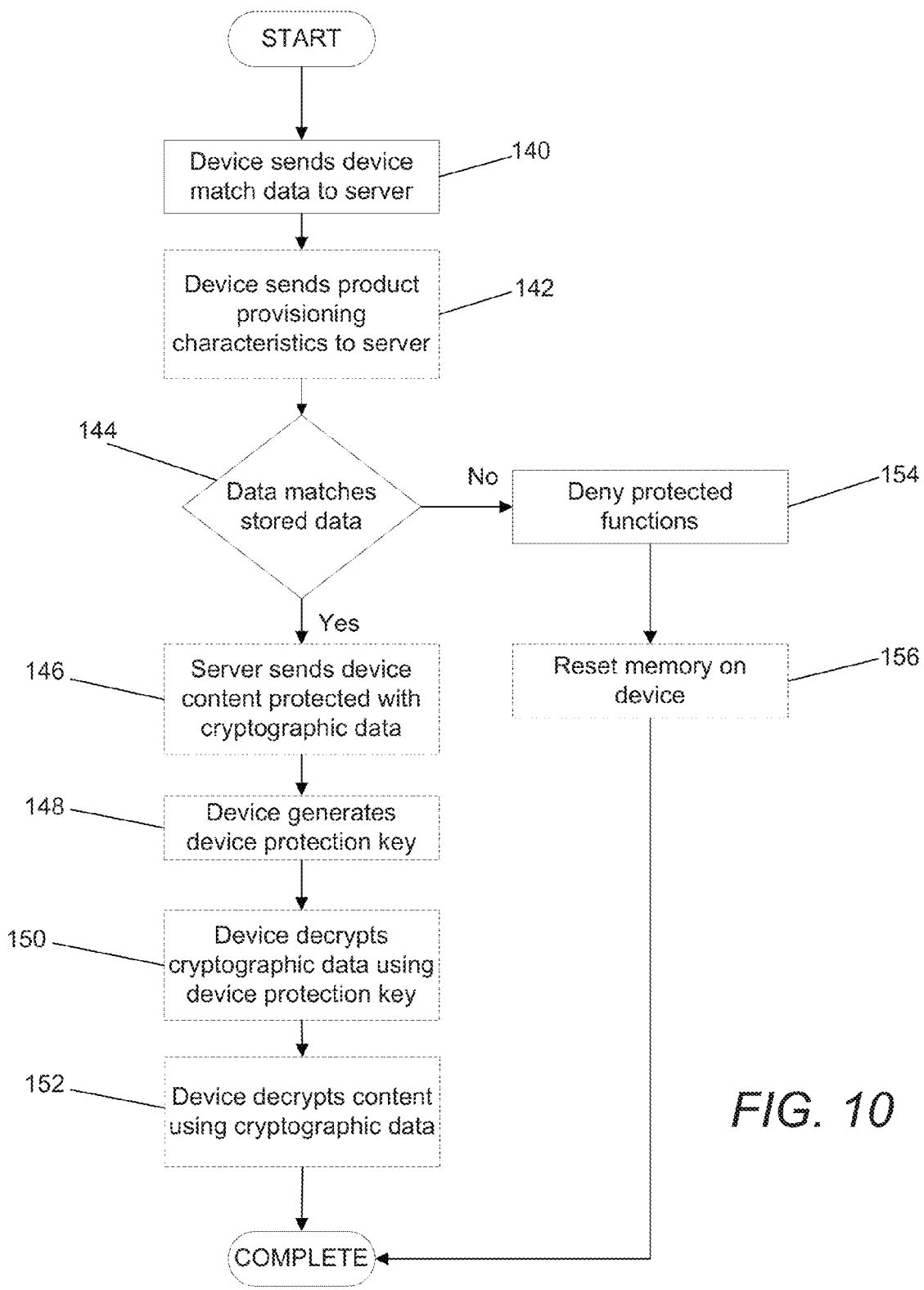
FIG. 10 is a flow chart illustrating a process that can be used by a server to verify device characteristics, in accordance with an embodiment of the invention.

In many embodiments of the invention, the verification process can be implemented where a server checks device match data against previously stored device match data. A flow chart illustrating a process for a server to verify device characteristics in accordance with an embodiment of the invention is shown in FIG. 10. In several embodiments of the invention, the server can be a registration server, content server, or other type or server with which the device needs to communicate. In various embodiments of the invention, the verification can be done when a device is requesting content, when otherwise communicating with a server, or independently of another session with the server. In further embodiments of the invention, a server can store previous verification sessions so that patterns of suspicious activity can be detected.

The device discovers or collects device match data from its hardware and/or software components, as described above. The device sends (140) the device match data to a server. The device can also send (142) product provisioning characteristics to the server. As described above in the registration process, a server has hash values for device match data of the device stored in memory. The server employs a matching algorithm (such as when a device self-verifies as described above) to determine (144) whether the presently received device match data match the registered device match data stored for the device. If there is a positive match, the device is considered verified and can proceed with protected functions such as receiving content.

If the device had requested content from the server, the server sends (146) content encrypted with cryptographic data that is specific to the device and/or user. In some embodiments, the encrypted cryptographic data on the device is encrypted with a device protection key. The device may have already generated and stored a device protection key in memory (e.g., generating and storing the key in volatile memory upon power-on). If not, the device collects device match data from its components and generates (148) a device protection key. The device decrypts (150) the encrypted cryptographic data in non-volatile memory using the device protection key. The device uses the unencrypted cryptographic data to decrypt (152) the content received from the server.

If there is no match of device match data, the device is prevented (154) from executing protected functions. The memory on the device can be reset (156) so that it is treated as a new device by the DRM system or other corrective measures can be taken.

In further embodiments, the encrypted cryptographic data may have been encrypted with additional encryption keys, such as a product key.

In some embodiments, the registered device match data is stored on a registration server, trusted system, or other third-party system other than the server that the device has contacted. The server contacted by the device can coordinate with the third-party system to verify the device's match data. For example, a device may have contacted a content server to request content. While the content owner utilizes and has access to a DRM system that the device is registered with, the DRM system owner maintains security by not sharing the device's cryptographic data and registered device match data with the content owner. Instead, the DRM system receives content or a set of keys to be encrypted, encrypts it using cryptographic data, and returns it to the content server to pass on to the device. Or, the DRM can receive device match data to verify against registered device match data, and returns an affirmative or negative response. Thus, in such an embodiment, verification by the server (144) includes collecting and passing on the device match data to the DRM system to perform the matching.

In further embodiments, a server can record attempts by a device to verify its device match data. By maintaining such a record, and performing pattern matching, the server can detect suspicious activity where a device may have had its encrypted cryptographic data or other credentials copied to an unauthorized device. For instance, an unauthorized device may have memory copied from a device that has registered its device match data with a DRM system in accordance with embodiments of the invention. When the unauthorized device attempts to verify with the server, the device match data collected from the unauthorized device will not match the device match data registered with that user account. Repeated failed attempts at verification can result in flagging the device on the registration server.

Tokens to Preserve Verified Session or Represent Data

Tokens can be used as a credential to maintain a communication session between a server and client device so that the device does not have to identify itself and send other credentials which may be a larger amount of data. Tokens can also be a smaller representation of a larger set of data.

In several embodiments, when a device has opened a session with a server and verified its device match data, it may obtain one or more tokens to keep the session open without having to send device match data again and re-verify. In further communications with the server, the device can use the token to identify itself. The server may determine when a session is complete and expire the token, or expire the token after a certain amount of time has passed or uses of the token have occurred.

Just as computing hash values for device match data can reduce the bit length required to represent the device match data, a token can be created to represent the entire set of device match data. The amount of space used to store the token can be even less than that used to store the hash values.

Validating Device Clock Using an Anti-Rollback Process

Figure 11:
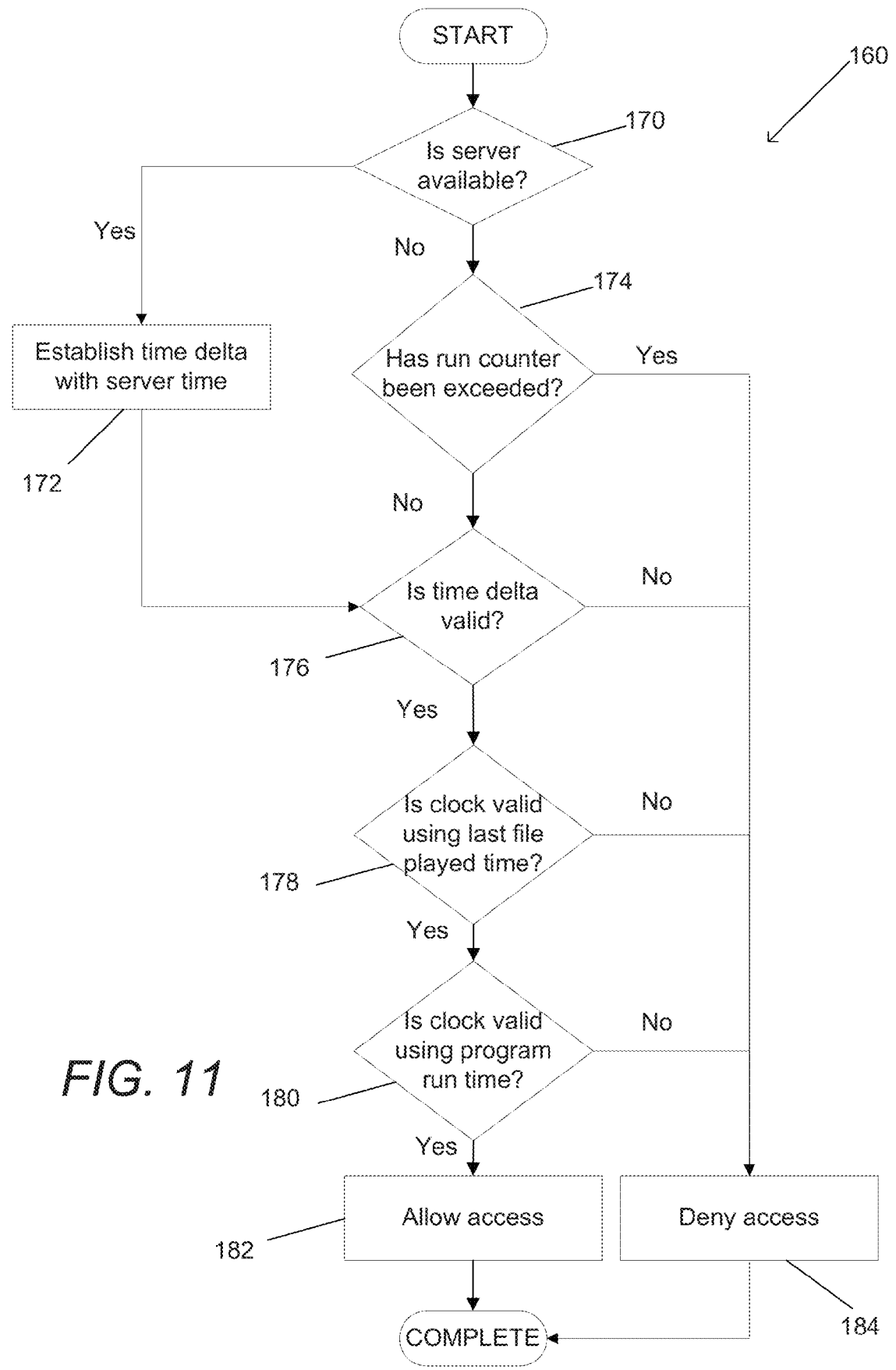
FIG. 11 is a flow chart illustrating a process for validating time stamps using a playback device in accordance with an embodiment of the invention.

As discussed above, timestamps can be stored on a device that represent the time that various events on the device occurred. By checking that the current time of the device clock is not earlier than the time in the timestamps, there is some assurance that the device clock has not been rolled back. In many embodiments of the invention, a device may verify its system clock, for example, during a power-on operation, when content is played, or when content is requested. Moreover, in embodiments of the invention that utilize timestamps or playback restrictions for certain content, those timestamps and/or playback restrictions are validated. A process for verifying a device clock using timestamps in accordance with an embodiment of the invention is shown in FIG. 11.

The process may be run when playback is requested, in which case the device may attempt to connect to a DRM server or content server in a "connected playback" mode. The device determines (170) whether a server is available. If a server is not available (i.e., the device will play content in a "disconnected playback mode"), the device determines whether the run counter has been exceeded (174). The counter (s) that are checked can be a run counter and/or a content run counter. As discussed above, a run counter can indicate how many times any content has been played in disconnected playback mode (i.e., the device is not in direct communication with a server), or alternatively how many times the playback application has been run (dependent on the design of the DRM system). A content run limit or maximum run count is a playback restriction that specifies how many times a particular piece of content may be viewed. In many embodiments, a content run counter is used for "disconnected playback" mode to track how many times the content is played without the device connecting to a server. Run counter validation can include comparing the content run counter to the content run limit. If the run counter exceeds a preset threshold, access to playback is denied (184). If the run counter does not exceed the maximum run count, then the playback device proceeds to determine (176) whether the stored server time delta is valid.

If the device has determined that a server is available for "connected playback," the device establishes the server time delta with respect to the time given by the server, and proceeds to determine (176) whether the server time delta is valid.

The server time delta indicates the difference or skew between the time provided by the server clock and the time on the device clock. The algorithm may determine validity of the time delta in various ways, including whether it is consistent with one or more time deltas previously calculated or whether it falls within predetermined limits. In some embodiments of the invention, the time of the server clock is received from the server as a timestamp. In further embodiments, the time of the server clock is a timestamp embedded within a content file.

The playback device determines (178) whether the device clock is valid using the last file played timestamp. The last file played timestamp can be a global value representing the last time any content file was played, and/or an individual timestamp that stores the last time the requested piece of content was played. Typically, the device clock may be found valid if the timestamp is earlier than the current time according to the clock, although any of a variety of different rules may be implemented. If the clock is invalid, playback is denied. If the clock is valid, the process proceeds.

The playback device also determines (180) whether the device clock is valid using the last program run timestamp. Typically, the device clock may be found valid if the timestamp is earlier than the current time according to the clock, although a different rule may be implemented. If the clock is invalid, access to playback is denied. If the clock is valid, access to playback is allowed.

In further embodiments of the invention, the playback device enforces playback restrictions for a particular piece of content when playback of that content has been requested. Any of a variety of playback restrictions or server connection restrictions may be validated by the playback device as part of the process. For example, a playback device can store the playback duration and playback commencement timestamp for each instance or a predetermined number of previous instances in which the piece of content is played back. The combination of timestamps and durations can be validated to confirm that they are consistent. In addition, the durations and timestamps can be compared to patterns indicative of tampering with the system clock of the playback device.

In many embodiments, processes similar to those described above are used to regulate device functions other than playback. For instance, the process may be applied to govern the retention of cryptographic data, DRM access information, or other sensitive information stored on the user device. In several embodiments, denying access to content can include invalidating cryptographic or other sensitive information by erasing the information or otherwise rendering it unusable. Thus, in several embodiments, if timestamp validation process fails, the cryptographic data is erased from the device. The device can then reregister with a DRM server or perform another similar process to acquire cryptographic data in order to be able participate in the DRM system and/or access content.

Although a specific process is illustrated in FIG. 11 for confirming that the system clock has not been rolled back when playing back content subject to time based restrictions, any of a variety of processes to verify the integrity of a system clock that involve securely storing timestamps on a playback device and then utilizing the timestamps to verify whether the current time indicated by the system clock is plausible can be utilized in accordance with embodiments of the invention.

Figure 12:
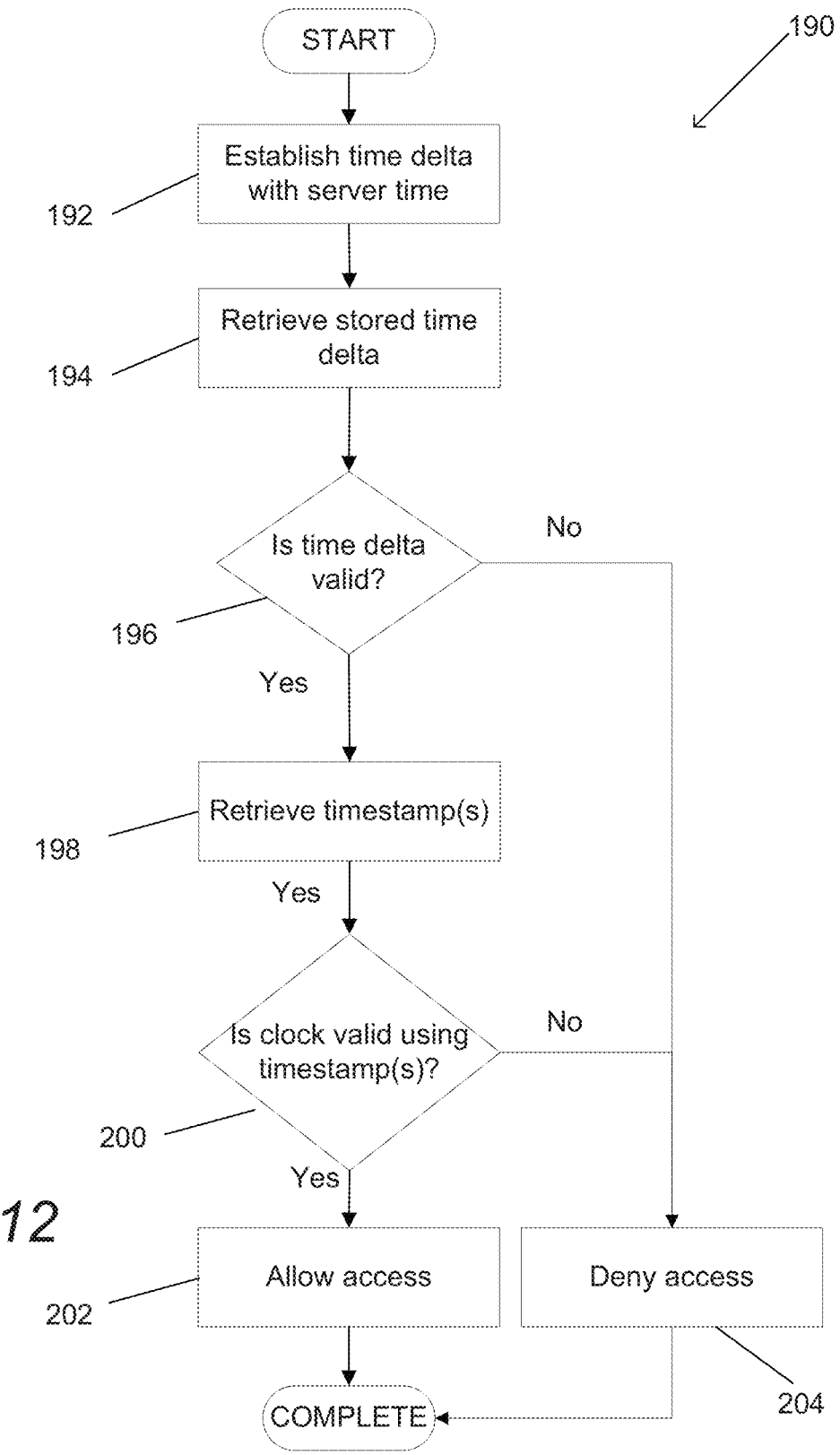
FIG. 12 is a flow chart illustrating a process for validating time stamps using a playback device in a connected playback mode in accordance with an embodiment of the invention.

Processes similar to the process illustrated in FIG. 11 may be implemented in connected (i.e., where a server is presently available) and disconnected (i.e., server is not presently available for connection) playback modes. A generalized process 190 for verifying a device clock using timestamps in a connected playback mode in accordance with an embodiment of the invention is shown in FIG. 12.

A playback device establishes (192) a time delta between its system clock and a server time. The playback device retrieves (194) a stored time delta and determines (196) whether the measured time delta is valid. As can readily be appreciated, in other embodiments of the invention, a stored time delta may not be necessary for validation. The device may use rules to validate the time date without using a stored time delta, such as testing for consistency with previous measurements or that the value is within a specified range.

If the time delta is valid, the playback device retrieves (198) one or more timestamps from memory. The playback device determines (200) whether the device clock is valid using the retrieved timestamp(s). Typically, the device clock may be found valid if the timestamp(s) is earlier than the current time according to the clock, although different rules may be implemented. If the clock is valid, access to playback is allowed (202). If the clock is invalid, access to playback is denied (204). Although a specific process is illustrated in FIG. 12 for confirming that the system clock has not been rolled back when playing back content in a connected playback mode, any of a variety of processes to verify the integrity of a system clock that involve securely storing timestamps on a playback device and then utilizing the timestamps to verify whether the current time indicated by the system clock is plausible can be utilized in accordance with embodiments of the invention.

Figure 13:
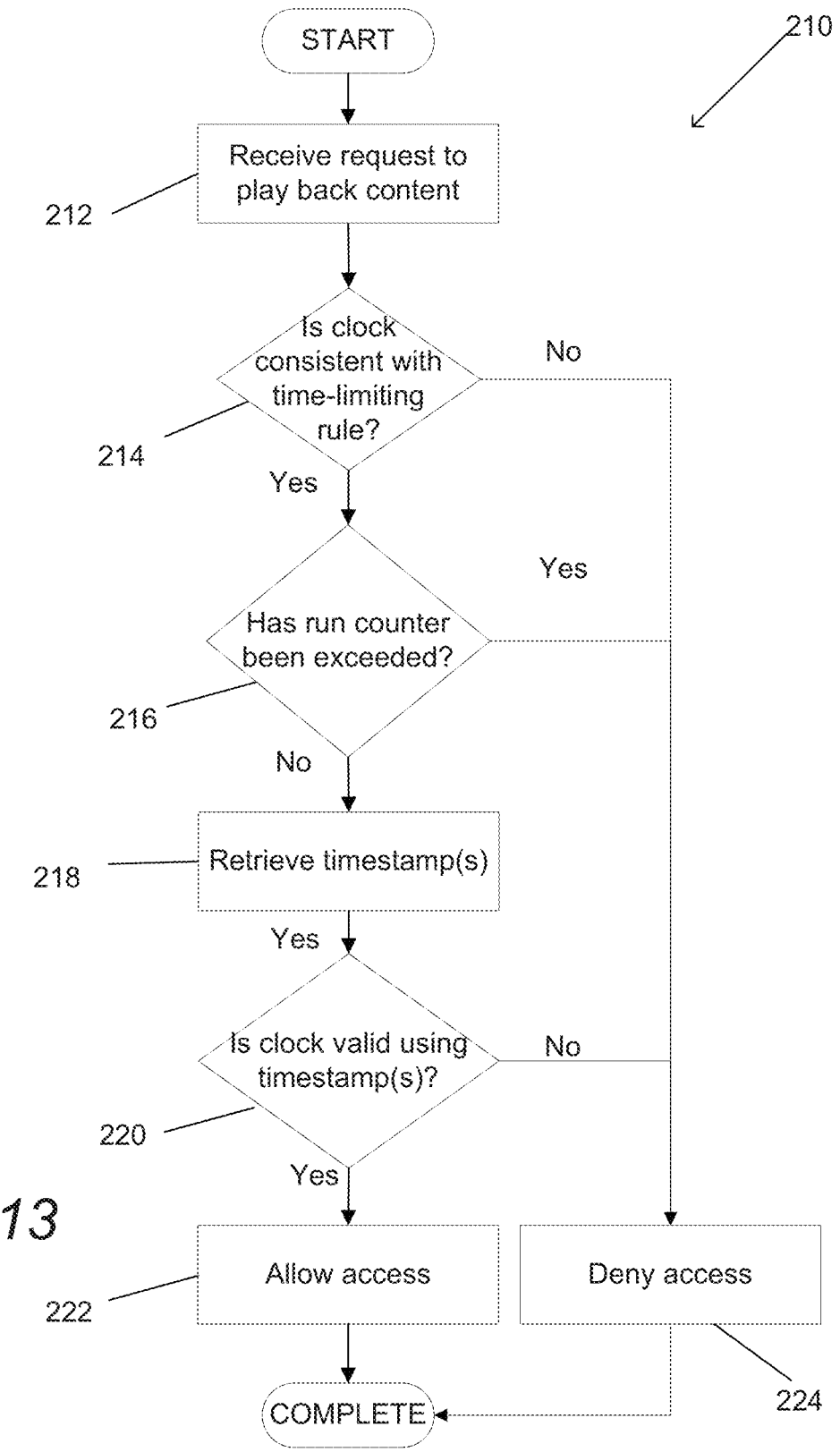
FIG. 13 is a flow chart illustrating a process for validating time stamps using a playback device in a disconnected playback mode in accordance with an embodiment of the invention.

A generalized process 210 for verifying a device clock using timestamps in a disconnected playback mode in accordance with an embodiment of the invention is shown in FIG. 13. A playback device receives (212) a request to play back content. In many embodiments, the request is received via a user instructions executed through a user interface on the device. The playback device determines (214) whether the clock is consistent with a time-limiting rule associated with the content. If the clock is consistent with the time-limiting rule, the playback device determines (216) whether a run counter has been exceeded. As discussed above, a run counter may be kept for a specific piece of content and/or for all content played back on the device. The playback device retrieves (218) one or more timestamps from memory. The playback device determines (220) whether the device clock is valid using the retrieved timestamp(s). Typically, the device clock may be found valid if the timestamp(s) is earlier than the current time according to the clock, although different rules may be implemented. If the clock is valid, access to playback is allowed (222). If the clock is invalid, access to playback is denied (224). Although a specific process is illustrated in FIG. 13 for confirming that the system clock has not been rolled back when playing back content subject to a time-limiting rule in a disconnected playback mode, any of a variety of processes to verify the integrity of a system clock that involve securely storing timestamps on a playback device and then utilizing the timestamps to verify whether the current time indicated by the system clock is plausible can be utilized in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of securing cryptographic data used to playback encrypted content on a playback device, the method comprising:

securely storing at least one timestamp in memory within a playback device in response to the occurrence of at least one predetermined event, where a stored timestamp is based on the current time of a system clock within the playback device when a predetermined event occurs, where the at least one timestamp is secured using at least a product key derived from product provisioning characteristics, and where the predetermined event arises from a playback event of a specific piece of content by the playback device;

generating a cryptographic key using information including the at least one time stamp;

securing cryptographic data used to playback encrypted content on the playback device using the cryptographic key;

receiving a request to playback encrypted content via a user interface on the playback device, where the encrypted content is accessible using the cryptographic data securely stored in the memory of the playback device;

accessing the at least one timestamp securely stored in memory using the playback device;

deleting the cryptographic data from memory, when the system clock is invalid;

generating the cryptographic key using information including the at least one retrieved time stamp;

decrypting the cryptographic data using at least the cryptographic key generated using information including the at least one retrieved timestamp;

decrypting at least a portion of the encrypted content using the cryptographic data;

and playing back the content using the playback device.

2. The method of claim 1, wherein the cryptographic data is further secured using device match data.

3. The method of claim 1, further comprising validating the system clock of the playback device using the at least one timestamp.

4. A playback device, comprising:

a processor;

memory containing a client application; and a system clock;

wherein the processor is configured by the client application to:

securely store at least one timestamp in memory in response to the occurrence of a predetermined event, where a stored timestamp is based on the current time of a system clock when the predetermined event occurred, where the at least one timestamp is secured using at least a product key derived from product provisioning characteristics, and where the predetermined event arises from a playback event of a specific piece of content by the playback device;

generate a cryptographic key using information including the at least one time stamp;

secure cryptographic data used to play back encrypted content on the playback device using the cryptographic key;

receive a request to playback encrypted content via a user interface, where the encrypted content is accessible using the cryptographic data securely stored in the memory of the playback device;

delete the cryptographic data from memory, when the system clock is invalid;

regenerate the cryptographic key;

decrypt the cryptographic data using at least the cryptographic key;

decrypt at least a portion of the encrypted content using the cryptographic data;

and play back the content.

5. The playback device of claim 4, wherein the client application configures the processor to regenerate the cryptographic key by configuring the processor to:

access the at least one timestamp securely stored in memory; and generate the cryptographic key using information including the at least one retrieved timestamp.

6. The playback device of claim 4, wherein the cryptographic data is further secured using device match data.

7. The playback device of claim 6, wherein the client application further configures the processor to retrieve device match data and generate a device protection key that can be used in the generation and regeneration of the cryptographic key.

8. The playback device of claim 4, wherein:
the requested to playback encrypted content refers to a piece of content that is subject to a time-limiting rule; and
the client application further configures the processor to determine whether the current time of the system clock of the playback device is consistent with the time-limiting rule associated with the piece of content.

9. The playback device of claim 8, wherein the client application further configures the processor to validate the system clock of the playback device using the at least one timestamp stored in the memory of the playback device.

10. The playback device of claim 9, wherein the at least one timestamp includes a last program run timestamp indicating the last time the client application was run and the client application configures the processor to validate the system clock based upon the last program run timestamp.

11. The playback device of claim 9, wherein the at least one timestamp includes a last file played timestamp indicating the last time the client application played a file on the device and the client application configures the processor to validate the system clock based upon the last file played timestamp.

12. The playback device of claim 9, wherein the at least one timestamp includes a last server connection timestamp indicating the last time the device connected to a server and the client application configures the processor to validate the system clock based upon the last server connection timestamp.

13. A non-transitory machine readable medium containing processor instructions, where execution of the instructions by a processor causes the processor to perform a process comprising:

securely storing at least one timestamp in memory within a playback device in response to the occurrence of at least one predetermined event, where a stored timestamp is based on the current time of a system clock within the playback device when a predetermined event occurs generating a cryptographic key using information including the at least one timestamp, where the at least one timestamp is secured using at least a product key derived from product provisioning characteristics, and where the predetermined event arises from a playback event of a specific piece of content by the playback device;

securing cryptographic data used to playback encrypted content on the playback device using the cryptographic key;

receiving a request to playback encrypted content via a user interface on the playback device, where the encrypted content is accessible using the cryptographic data securely stored in the memory of the playback device;

accessing the at least one timestamp securely stored in memory using the playback device;

deleting the cryptographic data from memory, when the system clock is invalid;

generating the cryptographic key using information including the at least one retrieved timestamp, when the system clock is valid;

decrypting the cryptographic data using at least the cryptographic key generated using information including the at least one retrieved timestamp;

decrypting at least a portion of the encrypted content using the cryptographic data; and playing back the content using the playback device.

* * * * *